Patented June 6, 1950

2,510,486

UNITED STATES PATENT OFFICE 2,510,486

COMPOSITION FOR THE CONTROL OF COCCIDIOSIS

Emanuel Waletzky, Stamford, Conn., assignor to American Cyanamid Company, New York, N. Y., a corporation of Maine No Drawing. Application October 6, 1948, Serial No. 53,149

5 Claims. (Cl. 167—53.1)

This invention relates to new means and methods for the prevention and control of coccidiosis.

Coccidiosis is an economically important disease of the animal kingdom. Although it is especially prevalent and destructive in chickens and turkeys, it is also found in lambs, calves, and other domesticated animals. The losses in the poultry industry are especially high, as most flocks are subjected to the disease in one form or another during their life cycle.

The causative organism of coccidiosis is a protozoan which is introduced into the intestinal tract through oocysts which usually contaminate the animal's feed. The principal genus of the protozoan causing coccidiosis in domesticated animals is the Eimeria of which there are various species which cause different types of infection having various degrees of mortality. The species Eimeria tenella is especially prevalent in coccidiosis of chickens. Onset of the disease is brought about by sporozoites which are released from the oocysts in the digestive system which then invade the lining of the ceca of the intestinal tract and cause hemorrhage of the tissue. Later, in their life cycle, the sporozoites release merozoites which re-enter the intestinal tract and in turn invade other cells of the intestinal lining. The animal either dies or its growth is stunted.

Numerous drugs have been suggested for the treatment of coccidiosis, but most of these have one or more disadvantages. Some of these, such as the arsenicals and sulfur affect only the sporozoites, and thus, while they may act prophylactically in preventing the disease, they do not cure it once it has been established in the animal. Others such as borax and the sulfa drugs act on the merozoites or inhibit their formation and can effect a cure. However, some of these drugs are excessively toxic and may cause reduction in normal rate of growth, vitamin deficiency or other undesirable symptoms. Some of the known drugs for treating coccidiosis are expensive or require large dosages.

Because of the fact that most of the drugs available to the farmer for the treatment of coccidiosis possess one or more of the disadvantages mentioned above, there is a strong demand for improved means and methods for prevention and control of coccidiosis. As a result of the investigation of a large number of different kinds of substances which might be used in the prevention, treatment, and control of coccidiosis, I have discovered that a known chemical substance which can be made very cheaply will, in the dosages hereinafter recommended, prevent and even cure coccidiosis without itself adversely affecting the health of the animal or interfering with its normal rate of growth. This new drug is m,m'-dinitrodiphenyldisulfide, which has the empirical formula $C_{12}H_8N_2O_4S_2$. Its melting point is 83–84.5° C. when pure. As used in the treatment of coccidiosis as prescribed hereinafter, it is a slightly yellowish white powder, insoluble in water, but soluble in many organic solvents. It may be prepared in known manner by the reduction of m-nitrobenzenesulfonyl chloride with iodides.

One of the most important aspects of the present invention is my discovery that the particle size of the m,m'-dinitrodiphenyldisulfide is extremely important. For best results, the particle size of the drug should be not larger than 100 micra, or 0.1 mm. For some reason, larger particles of the drug are much less active on a weight basis. It is not necessary, of course, that all of the particles be smaller than 100 micra, but it is desirable that the major portion of the drug, by weight, have a particle size not larger than 100 micra. The minimum particle size does not appear to be critical, but practical considerations limit the minimum size to about one micron.

Generally it is desirable for the most effective results that the treatment be continued over a long period of time, from the first exposure soon after hatching until the bird or animal is ready for market, or has marked immunity as discussed below. The dosage of the drug in a continuing program will range from about five to 100 mgms. of the drug per kg. of body weight. The precise minimal effective concentration of the drug is dependent upon the number of organisms to which the bird is exposed. The above concentrations may not in all cases prevent the development of mild infections, but the resulting immunity protects the birds when treatment with the drug is terminated, which is of course a distinct advantage. In considering the dosage range mentioned above, the proportion of the drug containing particles of a maximum dimension of more than 100 micra is to be borne in mind. Obviously, if the drug contains many large particles, the dosage requirements will be raised so that the ingested material will contain enough of the smaller particles to provide a prophylactic or therapeutic dose, as desired.

The compound m,m'-dinitrodiphenyldisulfide may also be used to good advantage to prevent mortality in birds after the flock has already become afflicted with coccidiosis. Treatment may start as late as seventy-two hours after infection.

When using the drug to overcome an already established infection in the flock, it is advantageous to employ a somewhat higher dosage level of the drug. For example; from about 75 to 250 mgms. per kg. of body weight. Dosage with these high levels of the drug should not be continued beyond a week or ten days, because of possible danger that these higher concentrations may result in a reduction in the normal weight increase of the flock.

Although the birds, or animals, may be given direct individual doses of the drug during the treatment by oral administration one or more times per day during the critical period, a much more convenient and highly effective method of treatment is to mix the drug in the animal's food. Such medicated feeds should contain enough of the drug so that the dosage range indicated above will be ingested by the bird in its normal daily diet. Such medicated feeds would contain from about 0.005–0.06% of m,m'-dinitrodiphenyldisulfide in the food when the treatment is of a prophylactic nature to protect the birds from the deleterious consequences of the infection over long periods of time. Of course if the drug is used to stop an already established infection, the concentration of the drug may range from 0.06 to 0.2% of the total daily food intake. The drug is most conveniently mixed with the mash which may account for only part of the animals' total daily diet. In such a case, the feed should contain a proportionately higher percentage of the drug. Of course, the drug may also be mixed with cracked corn, wheat, or other conventional animal or poultry food. If desired, the drug may be dispersed in the drinking water with the aid of suitable solvents and/or suitable dispersing agents.

I claim:

1. A composition for the control of coccidiosis comprising a poultry feed containing m,m'-dinitrodiphenyldisulfide.

2. A composition of matter comprising animal feed and at least 0.005% by weight of m,m'-dinitrodiphenyldisulfide.

3. A composition of matter comprising animal feed and from about 0.005%–0.2% by weight of m,m'-dinitrodiphenyldisulfide.

4. A composition of matter effective in controlling coccidiosis which comprises animal feed and from 0.005% to 0.06% by weight of m,m'-dinitrodiphenyldisulfide having an average particle size within the range of from one to 100 micra in diameter.

5. A composition of matter effective in curing poultry of coccidiosis comprising poultry food and from 0.06% to 0.2% by weight of m,m'-dinitrodiphenyldisulfide having an average particle size within the range one to 100 micra.

EMANUEL WALETZKY.

REFERENCES CITED

The following references are of record in the file of this patent:

UNITED STATES PATENTS

| Number | Name | Date |
|---|---|---|
| 2,279,421 | Tisdale | Apr. 14, 1942 |
| 2,362,003 | Harwood | Nov. 7, 1944 |

OTHER REFERENCES

Brand, Chemical Abstracts, vol. 31, page 3461 (1937). (Copy in Scientific Library.)

Foss, Journal of the American Chemical Society, vol. 60, page 2729 (1938). (Copy in Scientific Library.)